(12) United States Patent
Parker

(10) Patent No.: US 6,478,149 B1
(45) Date of Patent: Nov. 12, 2002

(54) PACKAGING OF SMOKING ARTICLES

(75) Inventor: Michael Patrick Parker, Leighton Buzzard (GB)

(73) Assignee: British American Tobacco (Investments) Ltd., London (GB)

( * ) Notice: Subject to any disclaimer, the term of this patent is extended or adjusted under 35 U.S.C. 154(b) by 0 days.

(21) Appl. No.: 09/554,619

(22) PCT Filed: Dec. 2, 1998

(86) PCT No.: PCT/GB98/03590

§ 371 (c)(1),
(2), (4) Date: Jul. 19, 2000

(87) PCT Pub. No.: WO99/28212

PCT Pub. Date: Jun. 10, 1999

(30) Foreign Application Priority Data

Dec. 4, 1997 (GB) .............................................. 9725768

(51) Int. Cl.[7] .............................................. B65D 85/10
(52) U.S. Cl. ..................... 206/273; 206/264; 229/160.1; 229/203
(58) Field of Search ................................ 206/264, 268, 206/273, 271; 229/160.1, 203, 240, 120.1

(56) References Cited

U.S. PATENT DOCUMENTS

| 2,194,168 | A | * | 3/1940 | Klein ........................... 206/273 |
| 4,300,676 | A | * | 11/1981 | Focke et al. ................. 206/264 |
| 4,375,260 | A | | 3/1983 | Focke et al. |
| 4,460,088 | A | * | 7/1984 | Frgenstein et al. .......... 206/494 |
| 4,850,482 | A | * | 7/1989 | Campbell .................... 206/273 |
| 5,096,113 | A | | 3/1992 | Focke |
| 5,333,729 | A | | 8/1994 | Wolfe |
| 5,333,735 | A | | 8/1994 | Focke et al. |
| 5,511,658 | A | * | 4/1996 | Focke et al. ................. 206/271 |

FOREIGN PATENT DOCUMENTS

| DE | 89 01 535 | 5/1989 |
| DE | 41 34 567 A1 | 1/1993 |
| EP | 0 007 423 A1 | 6/1979 |
| EP | 0 395 249 A1 | 10/1990 |
| EP | 0 608 909 A1 | 8/1994 |
| GB | 2 038 765 A | 7/1980 |
| WO | WO 98/22367 A1 | 5/1998 |

* cited by examiner

Primary Examiner—Mickey Yu
Assistant Examiner—Troy Arnold
(74) Attorney, Agent, or Firm—Jones, Tullar & Cooper P.C.

(57) ABSTRACT

A rigid pack of smoking articles is made to have improved shelf life and to be resealable. A barrier material is sealed around the rigid pack. The rigid pack has a potential or actual access aperture extending from a top face into a major face. The barrier material has a line of severance or weakening defining a flap, which is in register with the potential or actual access aperture. Over the flap is a layer which overlaps it on each severable side with a portion having permanently-tacky adhesive. A non-adhered pull tab is preferably provided on the layer. To open the pack the user lifts the flap and if necessary the access aperture. After removal of a smoking article the gap in the barrier layer is reclosed and resealed by the repositioning of the adhesive layer, carrying with it the flap of barrier material. A machine for assembling the pack is also disclosed.

6 Claims, 6 Drawing Sheets

PACKAGING OF SMOKING ARTICLES

FIELD OF THE INVENTION

This invention relates to packaging of smoking articles, and to machines for that packaging. For convenience, the smoking articles (cigars, cigarillos, cigarettes, for example) will be referred to as cigarettes.

BACKGROUND OF THE INVENTION

It is conventional for cigarette packs, whether soft or rigid, to be overwrapped with a transparent layer of cellophane or similar material. Though this has some protective properties it does not seriously prolong shelf life, especially in adverse conditions such as those of very high or very low humidity. To gain access to the pack the user tears open and discards the transparent layer. EP-A-395249 however shows a transparent overwrap which is not entirely discarded.

In U.S. Pat. No. 5,333,729, FIGS. 11 and 12, a cuboid cigarette soft pack has a flap in the top face which on lifting tears away part of an overwrap layer. The flap may have permanently tacky adhesive so that it can be flattened down again onto the top face and reclose, to a certain extent, the hole it made in the barrier layer. Leak paths still exist, and it is not clear how the opening gives access to the contents of the pack.

We have previously proposed, in copending WO-A-9822367 to provide a resealable barrier enclosure for a pack.

SUMMARY OF THE INVENTION

The present invention provides a packet of smoking articles comprising a rigid cuboid pack having a top face, a bottom face, two side faces and major front and back faces, a charge of smoking articles contained in said rigid pack and a layer of barrier material overwrapping said pack to form a sealed enclosure around said pack, wherein the barrier layer includes a line of weakening defining a flap and an access aperture, said enclosure includes a label applied on said flap, said label comprising a permanently tacky portion, which portion, when said label is in an aperture closure position, surrounds said access aperture to allow resealing of said aperture upon said label being brought to said closure position thereof, and said rigid pack includes either a potential access aperture, being a flap defined by a line of weakening in the material of the pack, or an actual access aperture, being a portion missing from the material of said pack, said potential or actual aperture extending from the top face into one of said major faces of said rigid pack and being generally in registration with said flap of said barrier layer.

The present invention further provides a machine for making a packet as defined above, which machine includes a feed operable to supply a web of barrier material, a cutting station operable to form a line of weakening defining a flap and an access aperture in said web, an application station operable to apply a label, comprising a permanently tacky portion, over said flap in such a matter that when said label is in an aperture closure position said tacky portion of said label surrounds said access aperture, means operable to present a length of the label-bearing web as a wall to the top face of a rigid pack containing a charge of smoking articles, drive means operable to transfer said rigid pack transverse to said wall and being further operable to progress said rigid pack through the location of said wall of barrier material, a knife cutter operable to cut said web to length immediately after said web has been impacted by said pack, said rigid pack including either an actual access aperture, being a portion missing from the material of the pack, or a potential access aperture, being a flap defined by a line of weakening in the material of the pack, which actual or potential access aperture is generally in registration with the flap of said barrier layer, and heaters operable to form seals in said web of barrier material around said pack to form an enclosure.

A related machine is seen in our co-pending European Application 98306328.0 (EP-A-0 895 930) where however what is overwrapped is a charge of smoking articles in an incomplete frame.

The barrier material layer may be, for example, a metallised plastic or a plastic/metal laminate material.

The rigid pack of the present invention may be similar, for example, to the flip-top or shell and slide type packs.

The packet of the present invention may be inserted into an outer, which outer may be a rigid flip-top pack.

In this way an efficient, proper, access opening is available but is effectively hermetically resealable.

DESCRIPTION OF PARTICULAR EMBODIMENTS

Figure 1:
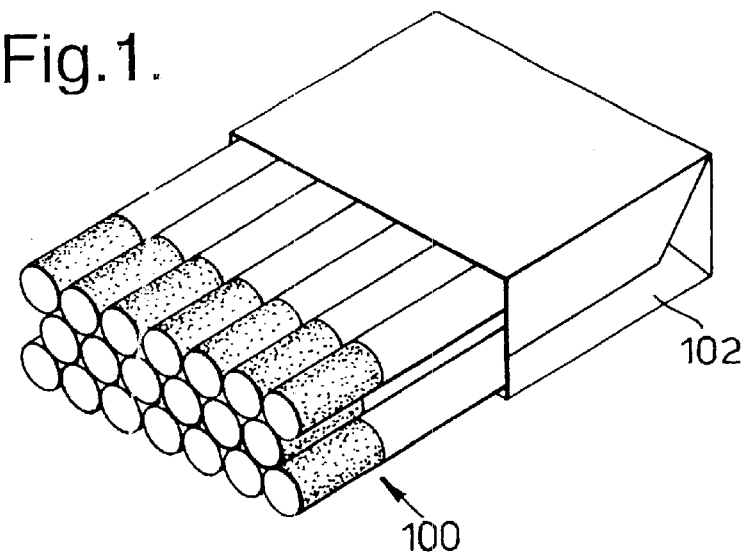
FIG. 1 is a perspective view of a charge of cigarettes.

FIG. 1 shows a charge of cigarettes 100 assembled in a conventional way and partly wrapped with a conventional foil/paper laminate 102 over approximately half of its length only. The foil having good dead fold characteristics will retain its form and the coherence of the charge of cigarettes in subsequent stages in which it is fed onto the sealer bed of a conventional carton erection packer where it is wrapped in a conventional manner with a carton formed from any of the blanks shown in FIGS. 2–6.

Figure 2:
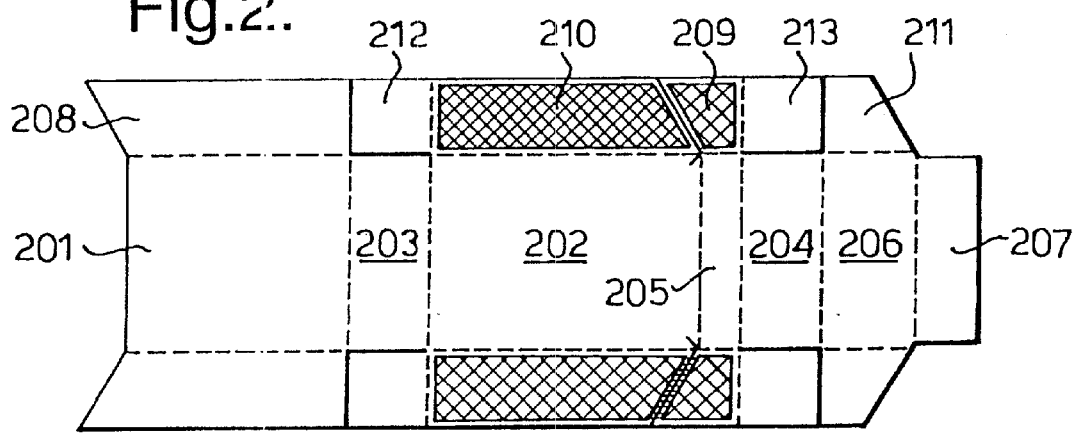
FIGS. 2–6 show face views of respective carton blanks.

The blank in FIG. 2 is essentially conventional for a rigid pack, with front and rear main panels 201,202 joined by hinge lines to a base panel 203 and a lid top panel 204. Between back panel 202 and top lid panel 204 is a lid back panel 205 and attached to the lid top panel 204 a lid front panel 206 with an extension tongue 207.

Side walls of the carton are to be formed by side panels 208 of the front panel 201 being adhered or heat-sealed outside respective side panels 210 of the back panels 202 and side wings 211 of the lid being adhered or heat-sealed outside side panels 209 of the lid back panel 205, at cross-hatched areas shown in panels 209 and 210. End flaps 212 and 213 lie in the erected carton inside base and lid top panels 203 and 204 respectively, and may be adhered or heat-sealed there. The extension tongue 207 is normally turned back and glued inside the lid front panel 206. Thus we get a rigid container.

Blanks giving greater stiffness in the made-up container are shown in FIGS. 3–6. All of these allow for access to the cigarettes through a central opening in the lid and front panel, through a resealable barrier layer.

Figure 3:
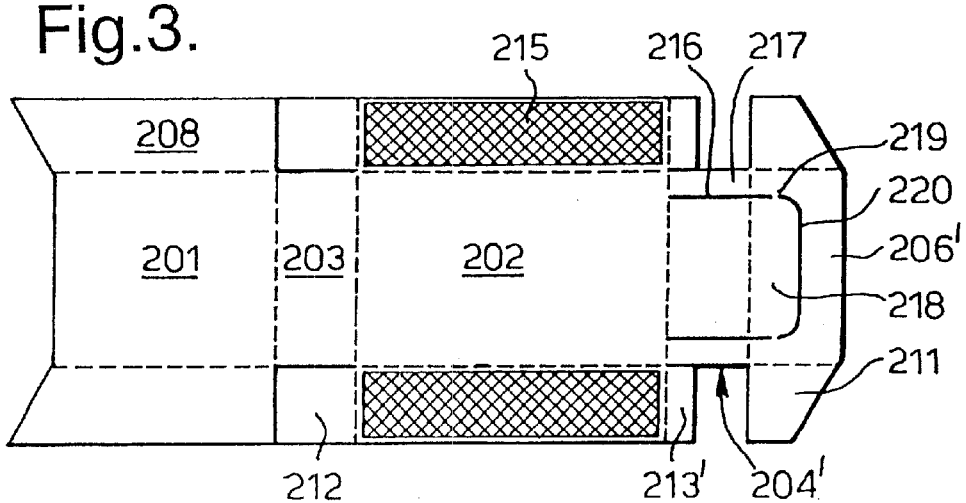
Figure 4:
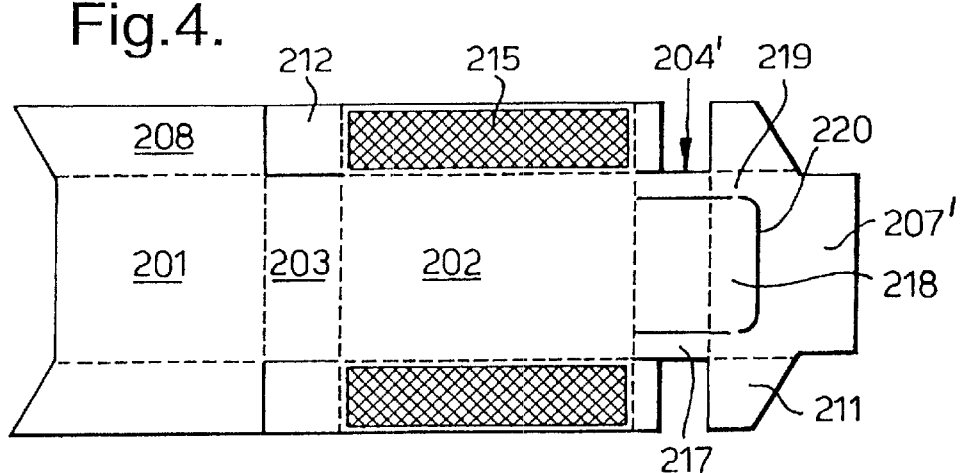

It will be seen in FIG. 3 that side walls 215 of the rear panel 202 are continuous over the whole length of that rear panel, with end tabs 213' being abbreviated compared to tabs 213. This is because in lid top panel 204' cuts 216 define side portions 217 and a flap portion 218. The cuts 216 continue into the lid front wall 206', terminating in uncut pips 219 which are joined by U-shaped cut 220 in the material of the flap 206'. FIG. 4 has a continuation 207' of the front panel, which will overlie the front panel 201.

When these are made up, essentially in the same way as the conventional blank of FIG. 2 with 208 and 211 adhered or heat-sealed over the cross-hatched area in the side walls 215, flaps 213' underlie and can be adhered or heat-sealed to side portions 217 of the lid top panel. The continuity of side walls 215 gives greater rigidity to the carton which has the appearance of a hinged lid carton but which gives access to the cigarettes by opening the flap 218 in the top lid. This is done after depressing the flap defined by cuts 220 and 216 to break the pips at 219.

The continuous side walls 215 are particularly useful if it is desired to use continuous side-sealing platforms during an overwrap procedure —compare side flaps 209,210 of FIG. 2.

Figure 5:
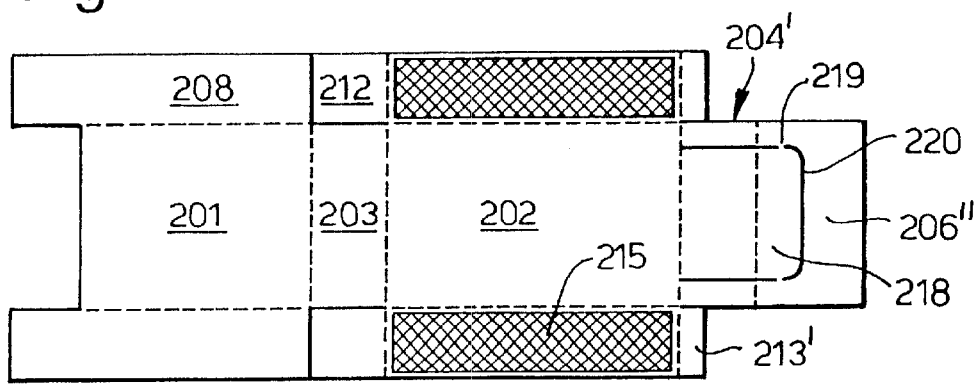

FIG. 5 is similar to FIG. 4 but has a front flap 206" with no side wings so that the appearance of a hingeable opening is not conveyed.

Figure 6:
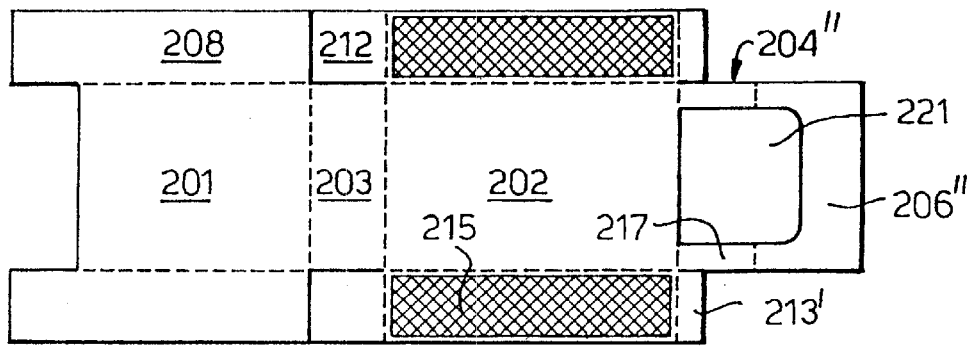

FIG. 6 shows a modification of FIG. 5 in which flap 218 is omitted, there being a permanent aperture 221 instead.

Figure 7:
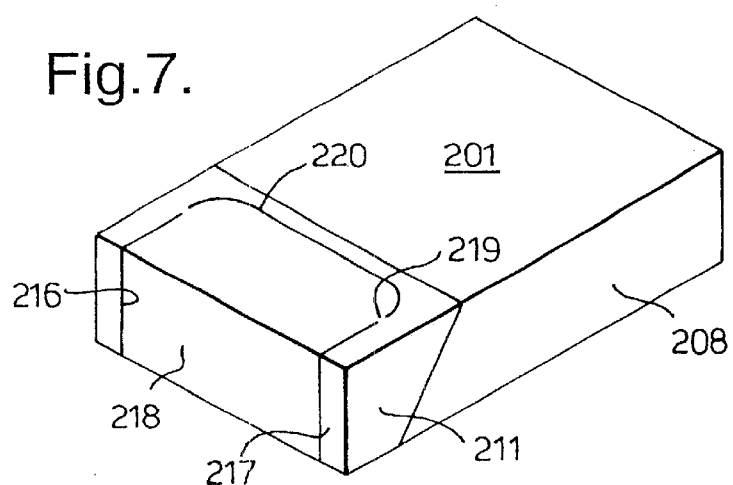
FIGS. 7–10 are perspective views of cartons made up from the blanks and containing a charge of cigarettes.
Figure 8:
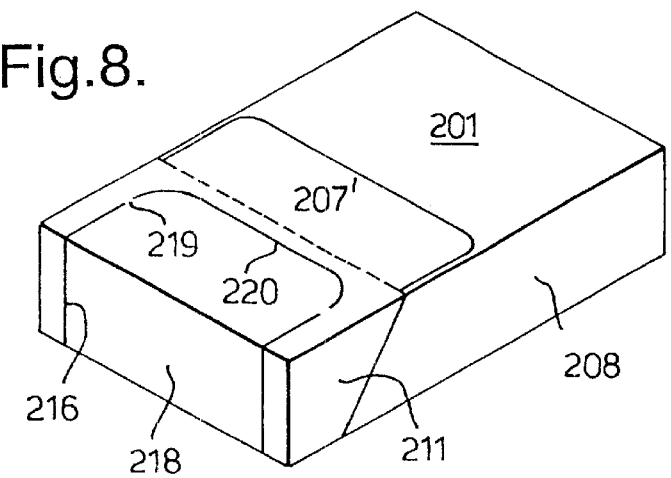

FIGS. 7 and 8 show how a pack is made up from the blanks of FIGS. 3 and 4 respectively, enclosing a charge as seen in FIG. 1.

In FIG. 7 the side panels 211 and 208, secured together to the continuous side flap 215, give the appearance of a flip-top pack. However, access to the cigarettes is gained by breaking the pips 219 and opening the flap portion 218. The pack in FIG. 8 is similar, but shows the extension 207' overlapping part of the front panel 201.

Figure 9:
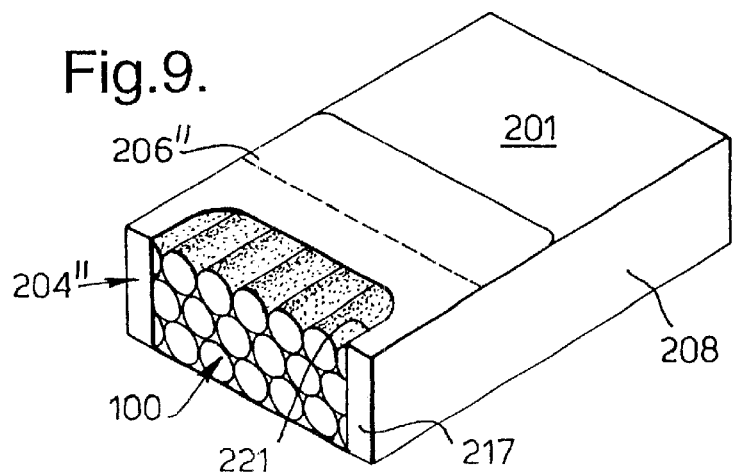
Figure 10:
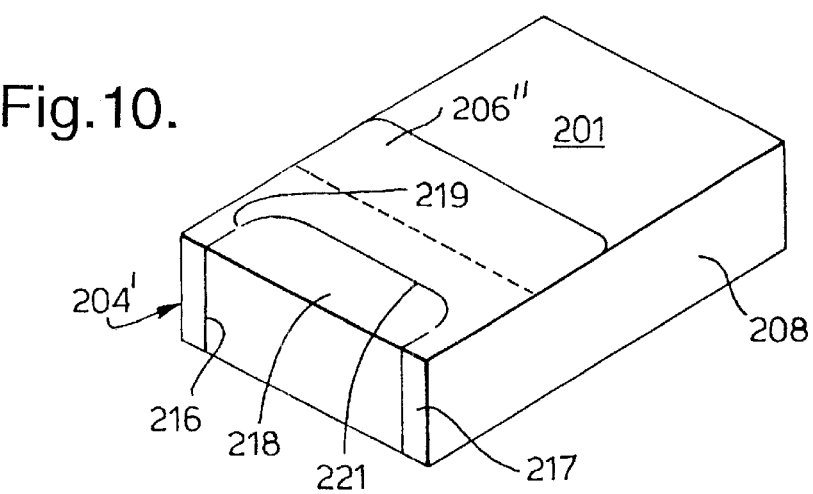

FIGS. 9 and 10 show a pack made up from the charge of FIG. 1 and respectively the blank of FIG. 6 and the blank of FIG. 5.

Figure 16:
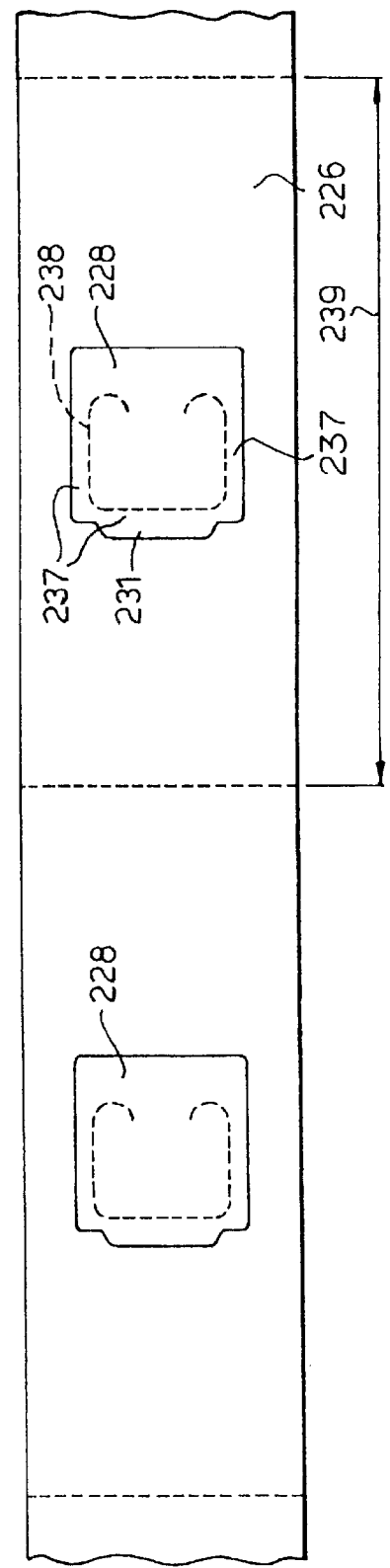
FIG. 16 is a face view of a labelled barrier material web.

The carton assembled from the blank of any of FIGS. 2 to 6 is now passed through a pre-severed and labelled barrier material seen in FIG. 16, on a machine seen in FIG. 15, both described more fully below. The result is a resealable rigid pack 225 of FIG. 11, the barrier material 226 having been conventionally folded and secured by heat-sealing, such that its opening 227 resealable by permanently-tacky overlapping boundary portions of a label 228 overlies the access opening 221 or is adhered or heat sealed to the flap 218 which then opens with it.

Figure 11:
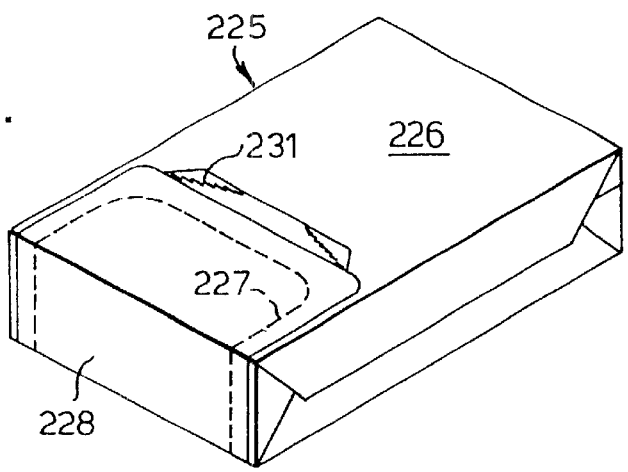
FIG. 11 shows an overwrapped rigid pack.
Figure 12:
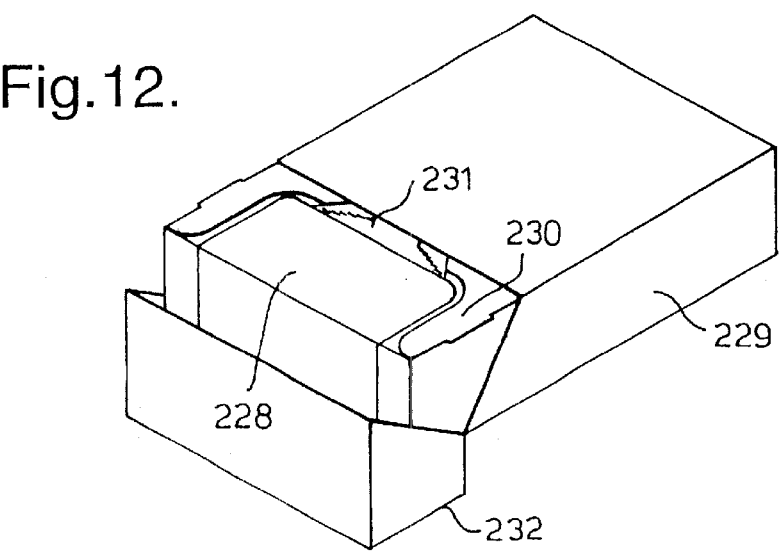
FIG. 12 shows the pack of FIG. 11 in an outer flip-top carton.

FIG. 12 shows how the overwrapped rigid pack of FIG. 11 may if desired be further enclosed in a conventional "flip-top" outer container 229 which may have an inner frame 230. Before insertion of the overwrapped pack into the outer carton 229 or erection of that outer carton around it, a lift tab 231 of the resealable label, free from adhesion or heat-sealing, is lifted so as to present itself to the user when the flip-top lid 232 is opened, as shown in FIG. 12.

Figure 14:
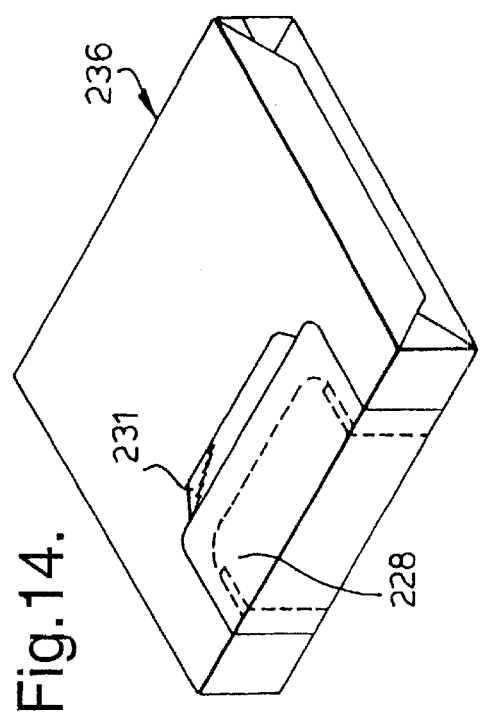
FIGS. 13 and 14 are perspective views of a shell and slide carton containing a charge of cigarettes.
Figure 13:
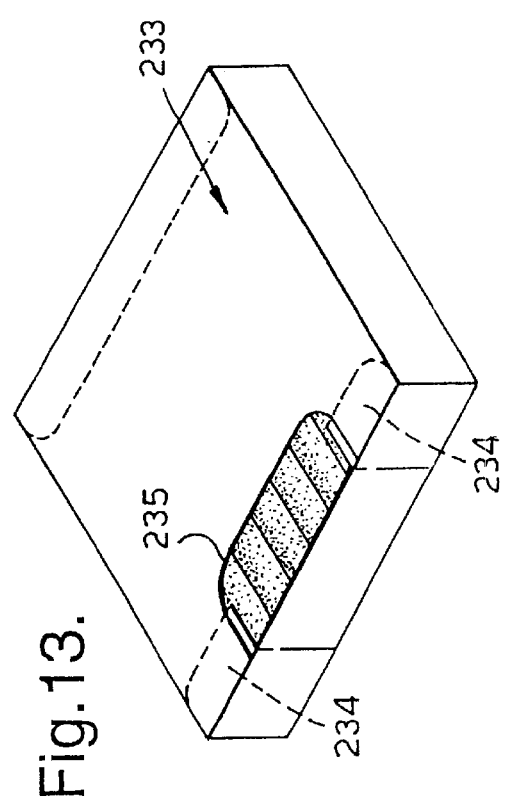

FIGS. 13 and 14 show how an otherwise conventional shell and slide carton 233 can be modified by cutting away part of the top front flap 234 in the slide and cutting a U portion 235 out of the shell, and then overwrapping as before to yield the pack 236 of FIG. 14, analogous to pack 225. If the carton is to be erected on conventional machinery, the charge should be as in FIG. 1.

As was disclosed in our WO-A-9822367, a hermetically resealable barrier enclosure can be provided by the application of a label 228 (FIG. 16) on a web 226 of barrier material such as a plastics/foil laminate or metallized film, with permanently tacky adhesive on a margin 237 of the label around a potential opening through the barrier, defined by line of weakening 238. This line of weakening must correspond with the potential or actual aperture 218,221 in the rigid pack which the web 226 will overwrap. A foil cut pitch 239 is illustrated. Tab 231 is non-adhesive and is to assist the eventual user in lifting the label. The label guides the user when resealing the opening so that the barrier material re-fills that opening and only a cut line remains as a potential leak path. This is covered by the label and its permanently tacky adhesive region beyond the line effectively completely reseals the enclosure.

Figure 15:
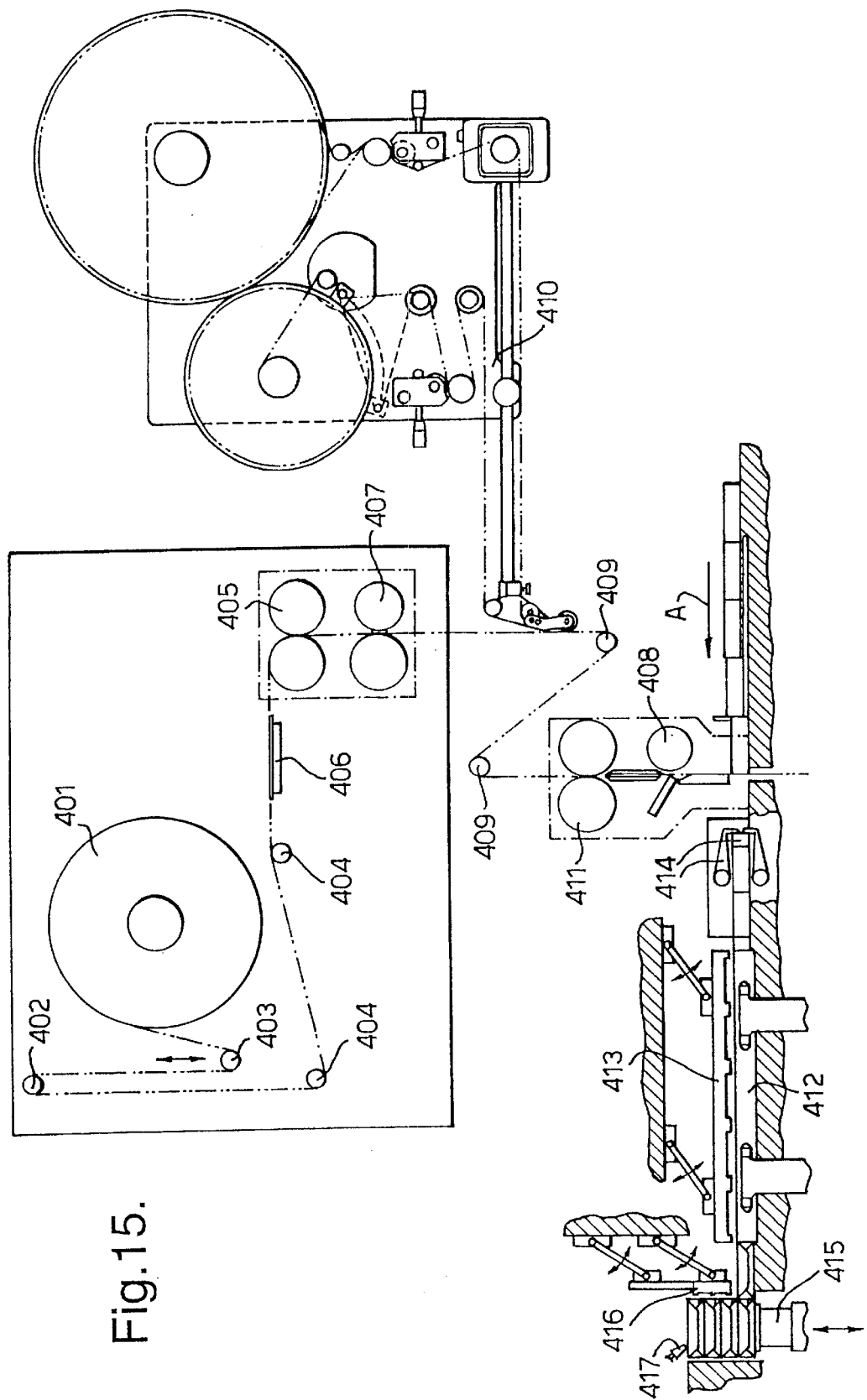
FIG. 15 is a side view of an enclosure-forming machine.

The cut pitch is provided by a main knife in the machine of FIG. 15. A reel of foil 401 (preferably laminated foil) carried on a bobbin is mounted on a spindle. The foil is led over two rollers 402 and 403, one or both of which is held on the end of a pivoted spring loaded arm so as to be of the nature of a dance roller. One of the arms is fitted with a braking arrangement which, in the event of the foil becoming too slack as it is pulled off by pulling rollers, causes the brake to act against the spindle to restore the desired level of tension. Other methods of tension control can be used including electrical speed matching of a motor used to drive the reel compared to desired foil velocity determined by the pulling rollers.

The foil is led to the pulling rollers 405 via a series of idler rollers 404 which guide it clear of obstructions and across a table 406 which forms a platform for manual or an automatic splicing system (not shown), which is required to join the start of a new reel of foil to the end of a previous reel.

Should the foil used have a printed pattern on it the foil will have to be registered correctly to the pattern on the cutting roller 407 which forms the line of weakening 238 and the main cutting knife 408. To achieve this, an encoder is used to determine the position of the cutting roller 407. The signal from this is compared to a registration mark on the foil which is detected before the pulling rollers. Any deviation from the desired comparison results in the speed of the pulling rollers being increased or decreased at a programmable rate to restore the desired comparison.

To ensure the foil is cut in the right position its length between the cutting roller 407 and the main knife 408 can be adjusted by moving the position of idler rollers 409 between them.

Soon after the cutting roller the label 228 is applied to the foil 226 by a conventional applicator 410. The label overlaps all sides of the line 238 defined by the rotary cutter. Both the tongue defined by the line of weakening or cut and the label pull tag 231 are best arranged to pass in the trailing rather than leading direction.

The foil with labels 228 on it is pulled through a further pair of drive rollers 411 and guided to the rotary main knife cutter 408 where it is cut to length immediately after it is impacted by a pack driven in the direction of arrow A. The pack, which continues to be moved forward by a pusher, has the ends of the foil lap folded and its sides envelope-folded by an arrangement of tuckers and ploughs 414.

From this point on the foil-overwrapped packs are pushed one against another through a series of side, top and end heaters which seal the foil to itself and the foil to tongue shaped "notched" openings in the pack to enable it to be lifted when the label is lifted.

Typically, the side 412 and top heaters 413 may be of the reciprocating type as shown or may be belt or tractor heaters.

To enable lap end sealing, the wrapped packs are preferably elevated one at a time by a reciprocating lifting mechanism 415 to pass in front of a reciprocating heater 416. They can then be taken in turn from the top of the four high stack to the next process which could be, for example, film overwrapping or card overwrapping. The latter, if required, could take the form of a hinge lid box. If so the inner frame in the hinge lid box would be styled to accommodate the opening of the label in such a way that the tab of the label overlapped the inner frame to make it stand up to be easier to get hold of.

Before application to the film or before the final overwrapping step, it may be desired to fold the pull tab 231 of the label back to enable its easier opening. If this is required the packs are pushed forward by a reciprocating pusher (into the paper) (not shown) and under a vacuum nozzle 417 which lifts the label tab and leads it under a plough (not shown) which it is pushed through by subsequent packs. The plough turns the tab right back on itself. The tab is then creased/tacked into position as it passes under a heater which presses down on it.

The process and equipment described above can be easily modified to provide for the manufacture of a resealable shell and slide arrangement of rigid pack.

What is claimed is:

1. A packet of smoking articles comprising:
    a rigid cuboid pack having a top face, a bottom face, two side faces and major front and back faces;
    a charge of smoking articles contained in said rigid pack;
    a layer of barrier material overwrapping said rigid cuboid pack to form a sealed enclosure around said rigid cuboid pack, said layer of barrier material including a line of weakening, said line of weakening defining a barrier layer flap, said barrier layer flap further defining a barrier layer access aperture;
    a label applied to said barrier layer flap, said label including a permanently tacky margin portion, said margin portion surrounding said barrier layer access aperture, when said barrier layer flap is in a barrier layer access aperture closing position, to allow resealing of said barrier layer aperture upon said label being brought to said barrier layer access aperture closing position; and
    a pack access aperture in said rigid cuboid pack, said pack access aperture extending from said top face of said rigid cuboid pack into one of said major faces of said rigid cuboid pack, said pack access aperture being in registration with said barrier layer flap.

2. A packet according to claim 1, wherein said rigid cuboid pack is a shell-and-slide pack.

3. A packet according to claim 1 wherein said rigid cuboid pack is enclosed in an outer.

4. A packet according to claim 2 wherein said rigid cuboid pack is enclosed in an outer.

5. A packet according to claim 3, wherein said outer is a rigid flip-top pack.

6. A packet according to claim 4, wherein said outer is a rigid flip-top pack.

* * * * *